United States Patent [19]
Sellers

[11] 3,945,448
[45] Mar. 23, 1976

[54] SYSTEM FOR PACKAGE WEIGHT CONTROL
[75] Inventor: Kenneth W. Sellers, Dallas, Tex.
[73] Assignee: Frito-Lay, Inc., Dallas, Tex.
[22] Filed: July 18, 1974
[21] Appl. No.: 489,605

[52] U.S. Cl. .................. 177/25; 177/119; 177/123
[51] Int. Cl.² .................. G01G 19/04; G01G 13/02
[58] Field of Search ......... 177/1, 122, 123, 119, 25, 177/116

[56] References Cited
UNITED STATES PATENTS
| | | | |
|---|---|---|---|
| 3,416,619 | 12/1968 | McClusky | 177/123 X |
| 3,690,391 | 9/1972 | Rust | 177/123 X |
| 3,708,025 | 1/1973 | Soler et al. | 177/1 |

Primary Examiner—George H. Miller, Jr.
Attorney, Agent, or Firm—Morton, Bernard, Brown, Roberts & Sutherland

[57] ABSTRACT
A system for package weight control. The system includes a digital for receiving material sufficient in volume to at least equal a desired net weight of product. At least one conveyor is mounted for conveying the material from a like number of feeders disposed at one end of the conveyor to the hopper disposed at the other end of the conveyor. Each feeder may dispense substantially similar volumes of material at spaced locations on each conveyor as the conveyors are advanced through predetermined incremental distances. The accumulated weight of the material on each conveyor belt is measured and a first digital signal representing the accumulated weight is generated and stored by a control. Each new accumulation on each belt likewise is measured and a second ditigal signal and so on representative of the accumulation is generated and stored. The weight of the quantity of material of the new accumulation is determined by subtracting the summation of digital signals from that digital signal representing the last summation. A digital signal representing the desired net weight of product to be received by the hopper is generated and stored. The control compares the latter signal with the signal representing accumulations as the accumulations are summed and advances the conveyor belt a sufficient distance so that a desired net weight of product is received by the hopper. One of the conveyors of multiple conveyors may convey a bulk volume of material to the hopper.

5 Claims, 6 Drawing Figures

SYSTEM FOR PACKAGE WEIGHT CONTROL

BACKGROUND OF THE INVENTION

This invention relates to a weight control system for rapidly and accurately dispensing a predetermined quantity of material into a container.

In high-speed packaging operations where material is batched into individual batches or charges which are then placed in a package on a net weight basis, certain long-standing and difficult to solve problems have been encountered. One of these problems is controlling or minimizing the package weight variance, that is, the excursion of net package weight from a desired predetermined net package weight. There are several reasons for variances in package weight. One reason is the inability of present package filling devices to feed material into a charge container at a constant rate. Considerable attention has been given by the industry to solving this problem, but attempted solutions have not been as successful as desired.

One of the best known methods of dispensing material to form a charge which is then packaged is commercially termed the "bulk-dribble" method. By this method, material is initially dispensed at a relatively high feed rate to form a charge until the weight of the charge reaches a preselected high percentage, for example, 90 percent of its ultimate net weight. This phase of the dispensing operation is termed the bulk feed interval. Once the weight of the charge reaches the preselected percentage of its ultimate weight, the material is dispensed at a lower feed rate. This phase is designated the dribble feed interval and is completed when the weight of the charge reaches the predetermined net weight. By using the "bulk-dribble" technique, the quantity of material in transit between the dispenser and the charge weighing scales is substantially reduced during the dribble feed interval which permits greater control of the ultimate quantity of material dispensed. The quantity of material in transit, however, is subject to random fluctuations which are not readily controllable by the dispensing mechanism. This is particularly so when the material consists of materials of non-uniform size and weight, such as potato chips and other such food items.

Another method of dispensing material to form a charge is disclosed in copending patent application Ser. No. 284,708, entitled "Weight Control System" and assigned to the common assignee herewith. In that package weight control system, the weight of material being dispensed into a hopper is continually monitored and compared with an idealized package weight curve. Thus, as the weight of the charge in the hopper progressively increases, the charge weight is made to follow the profile dictated by the idealized package weight curve. If the weight of the charge exceeds the idealized package weight, the feeder is temporarily shut down. On the other hand, if the weight of the charge is less than the idealized weight, the feeder is energized. By following an optimum profile curve, the weight of the charge is continuously monitored such that an accurate quantity of material is dispensed onto the hopper.

However, each of the aforementioned material dispensing techniques includes an inherent disadvantage. The time lag between the time an incremental amount of product is dispensed into a hopper or package and the time that a scale measures the weight of material therein permits extra amounts of material to be dispensed when, in fact, such extra materials are not required to bring the weight of the charge up to the predetermined desired weight limit. The time lag is composed of two elements, namely, the time required for the dispensed material to come to a state of rest in the hopper and the time required for the scales to advance to a new position of equilibrium so that a signal proportional to the new weight of the charge can be generated. In high-speed packaging operations, the time lag is significant relative to other system time constants and, in fact, limits the overall system response and accuracy. Any innovation in the packaging technology which eliminates or at least decreases this time lag will favorably improve the total system performance of the packaging system.

In view of and to overcome these problems or disadvantages of known prior art systems the present invention has for an object to provide a system for weighing a product into batches with a weight accuracy limit determined only by the product itself and/or the packager's need or desire to package a single or a plurality of product units at a time. Thus, the limit of accuracy is not determined by scale reference time, product settling time, scale hopper accommodations, feed rate, and the like which limit accuracy of all heretofore known systems.

SHORT STATEMENT OF THE INVENTION

Accordingly, in a first aspect this invention relates to a package weight control system wherein the system comprises apparatus including a charge receiving means; at least one conveyor belt means for conveying material to the charge receiving means in a quantity at least sufficient to equal the desired net weight of the packaged material; feeder means for dispensing a volume of material on each conveyor belt means to be conveyed to the charge receiving means; means for weighing the total dispensed volume material on each conveyor belt means after each dispensing operation while moving to the receiving means and for generating a signal representative of the sensed weight; and means for controlling the volume of material dispensed and the frequency of the dispensing operation, the movement of each conveyor belt means, and conditioned for storing a value representing each dispensed volume on the conveyor belt means, summing the values, and upon comparison with a signal representing the desired net weight of the package material advancing the conveyor belt means a sufficient distance that a required volume of material is passed to the receiving means.

In an additional aspect the present invention includes means for supplying a bulk charge of material equal to a major portion of the desired receiving means. Second means are provided for weighing the bulk charge and generating a signal representative of the value thereof. The control means is responsive to and sums the value with the other values to be compared.

In a further aspect the present invention includes two or more conveyor belt means and a feeder means for each conveyor belt means. The control means operates to control volume of material dispensed on each conveyor belt, the frequency of each dispensing operation, and the independent advance of each conveyor belt to pass the required volume of material determined by summing the values for each conveyor belt and determining the most accurate comparison with a signal representing the desired net weight of package material to the receiving means.

One of the convetor belts may convey a bulk charge.

DETAILED DESCRIPTION OF THE PREFERRED EMBODIMENT

Figure 1:
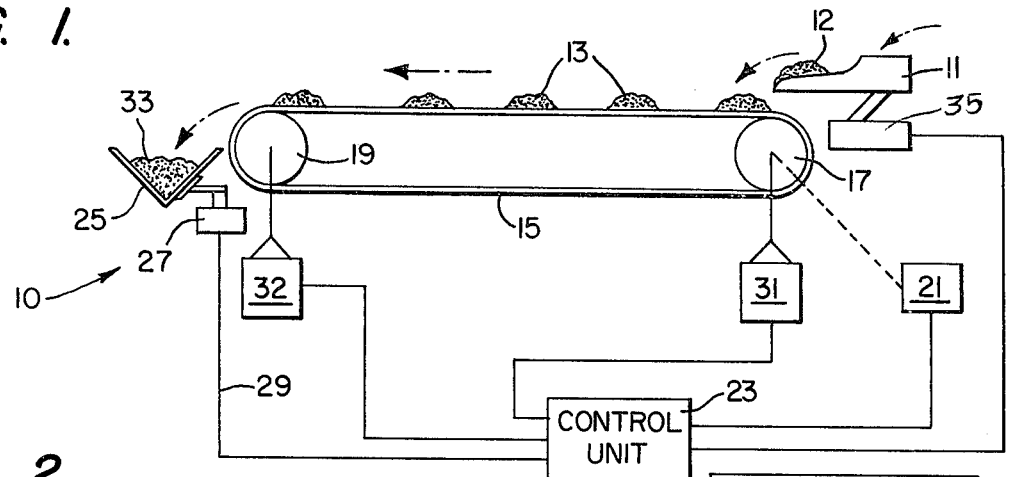
FIG. 1 is a simplified schematic illustration of the material dispensing system of this invention.

The package weight control system 10 of the present invention is illustrated to best advantage in FIG. 1. The system includes a feeder 11 for dispensing material. The material may be granulated in form or may consists of particles of variable weight and size, such as potato chips, to be packaged. The material, denoted by the numeral 12, first is disposed within the feeder for dispensing at times and in amounts controlled by the system. The material may be moved to the feeder by means (not shown) as are well known to satisfy continuously system demand. The material may be dispensed from the feeder as the feeder is caused to undergo a cycle of one or more feed movements. This operation will be discussed more particularly below.

Conveyor means in the form of a belt 15 having an elongated conveyor run is disposed below the feeder 11 for receipt of material 12 to be conveyed. The conveyor belt preferably is of endless type and provides an elongated run to a remotely disposed hopper. The conveyor belt is positioned about a first wheel 17 and a second wheel 19. The conveyor belt 15 may vary in width, as desired but, in the preferred embodiment, is only a few inches wide. Restraining sides (not shown) are positioned along the side of the conveyor belt to insure that unit amounts 13 of material 12 deposited in spaced relation on the belt do not fall off during deposition and transit to the end of the run. The conveyor belt, further, is formed to be capable of supporting the unit amounts, be they granulated or particulate in form.

A motor 21 is provided for driving the conveyor. The dotted line connection to the wheel 17 constituting the drive wheel represents a suitable drive train for driving the conveyor at desired speed in accordance with the commands of a control unit 23. As will be discussed the drive may be intermittent or continuous. And the conveyor belt, once a charge representing a portion of the accumulations on the belt is discharged to the hopper 25 adjacent the second or idler wheel 19, may be backed up to a position at which further unit amounts 13 are deposited immediately following the non-deposited unit amounts.

The hopper 25 is positioned at the other end of the conveyor run for receipt of the material to be packaged. A weighing means 27 supports the hopper. The weighing means continuously weighs the material in the hopper and generates continuously a digital signal representing the weight being sensed. The weighing means may include tare detector circuitry. As known to those skilled in the art this form of detector periodically measures the value of the residue accumulations on the hopper. This is normally carried out by periodically, after a predetermined plurality of charges have been dispensed, omitting the feed to the hopper for a complete cycle. During this cycle, the value of the scale signal with an empty hopper 25 is digitalized and stored in the tare detector, this being termed a "tare-detect mode". The tare-detect mode normally occurs at start up and can be instituted at any time thereafter.

In subsequent normal feed cycles, the value of the output of the tare detector is subtracted from the value representing the weight of the material charge 33, the summation then being the net value of the hopper charge exclusive of residue accumulation on the scale at the last tare-detect measurement.

Further discussion of the tare circuit may be obtained by resort to the above referred to patent application. For that purpose the application is incorporated herein by reference.

The summation signal of weighing means 27 is conducted over line 29 to the control unit 23. A pair of weighing means 31 and 32 attached to the shafts of the drive and idler wheels 17 and 19, respectively, continuously sense the weight of endless belt 15, the wheels 17 and 19, any ancillary support structure, and the unit amounts of material 13 on and travelling with the conveyor belt. Each weighing means is capable of generating a digital signal, these signals being summed and coupled to two inputs of the control unit 23. The summed signal is proportional to the weight of one or more unit amounts 13, only. To this end, appropriate circuitry will have cancelled out the weight of the conveyor belt and drive structure. As will be seen, the signal summation is coupled to the control unit at predetermined intervals.

Figure 2:
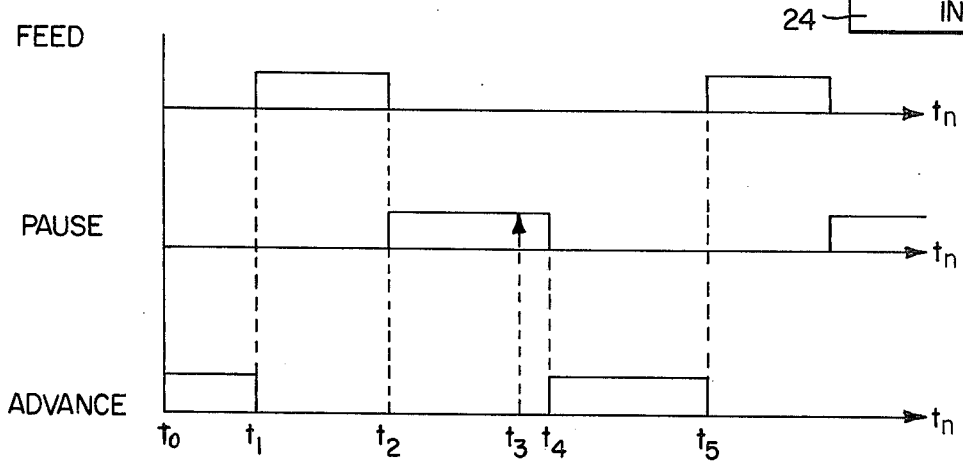
FIG. 2 is a graphical display of the timing waveforms associated with the feed control system of this invention.

The operation of the embodiment of the weight control system of FIG. 1 will now be described. The discussion will be enhanced by reference to the graphical display illustrated in FIG. 2. Assume at time $t_0$ there are no unit amount deposits 13 on the conveyor belt 15. A command advance pulse from control unit 23 energizes motor 21 to drive the conveyor belt at constant speed, as determined, over the time period $t_0$ to $t_1$. At time $t_1$ the constant positive advance pulse quickly goes toward negative. The feeder 11, responsive to the negative going side of the advance pulse, at time $t_1$ commences deposit of material 12 on the conveyor belt 15. The deposit of a unit amount 13 will have been received over the period $t_1$ to $t_2$, at which time a command pause pulse issues from the control unit. The pause pulse continues over the period $t_2$ to $t_4$. During this time period the feeding operation will be inactive. The drive motor will be inoperative, having stopped the drive to the drive wheel at time $t_1$.

The feeder is supported by a vibratory structure 35 or the equivalent. The structure, during the period of controlled operation suitably will dispense material at a linearly increasing rate. The period of operation, $t_1$ to $t_2$, may be adjusted so that a greater or lesser amount of material 12 is deposited.

The pause interval over the period $t_2$ to $t_4$ is sufficient to allow the transient variation of the weight sensed by the weighing means 31 and 32 to die out. At a selected time, toward the end of the pause interval, such as at time $t_3$, the weight measured by the weighing means 31 and 32 is detected by an appropriate strobing operation. The sensed weight from each of the weighing means is summed and stored in the control unit 23 by suitable known means, such as core memory or other suitable random access memory means.

At time $t_4$ the motor 21 continues the drive to the conveyor belt 15 to displace the first of the unit amounts 13 toward hopper 25. The operation continues until time $t_n$.

The unit amounts 13 of material dispensed onto the conveyor belt may not be of the same exact weight. Therefore, the weight of each unit amount must be ascertained separately. Thus, toward the end of each pause interval, the accumulated weight of the unit amounts on conveyor belt are detected, summed, and a signal representative of the increase in weight is coupled to the control unit 23 for storage. The unit amount of material most recently dispensed onto the belt is determined by subtracting the immediately preceeding value of the accumulated weight.

This process continues as the feeder 11 sequentially dispenses a plurality of unit amounts of material 13 onto the conveyor belt. The weight of each unit amount of material and positional information representing the number of batches dispensed onto the conveyor belt is stored in the memory of the control unit 23. At the same time, the ultimate weight value desired for the charge 33 in the hopper 25 is coupled in the form of a digital signal to the control unit 23 from the desired weight input 24. A continuous comparison between the summation of accumulations and signal representing the desired ultimate weight is carried out from time $t_1$. When a comparison is reached, no further commands are issued to the feeder 11, the motor 21 is energized and the conveyor belt 15 moves in the direction of the arrow that distance required to deposit the number of unit amounts of material necessary to being the weight of the charge in the hopper 25 up to the desired weight level.

If there are extra unit amounts of material on the belt 15 which were not required to fill the hopper to the desired weight limit, the belt may be automatically returned to a position at which the next succeeding space on the belt for receipt of deposited material is located under the feeder 11. Also, the belt may be moved ahead to deposit as bulk the residue of unit amounts 13 on the conveyor belt to begin a second fill. The former operation requires that information to be stored in the control unit be clocked into the memory in accordance with a time frame. These operations may ensue with any one of the embodiments of the invention including that next to be described and the embodiment of FIG. 6.

Figure 3:
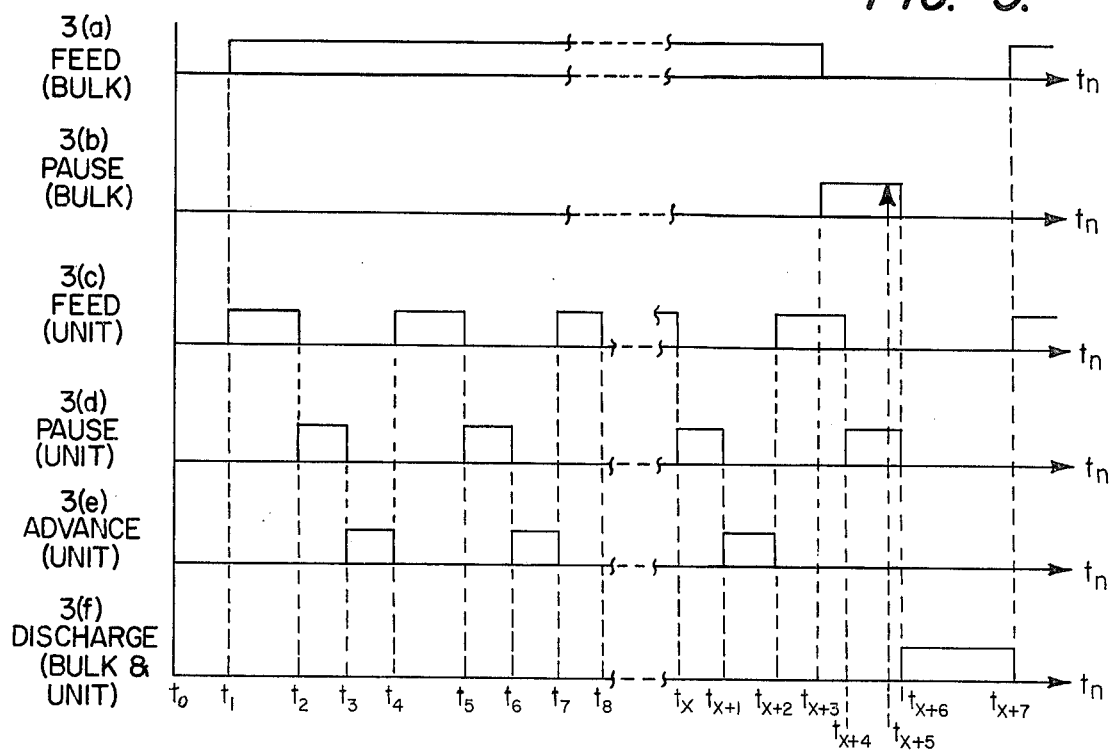
FIG. 3 is a graphical display of the timing waveforms associated with an alternate embodiment of the feed control system of this invention.
Figure 4:
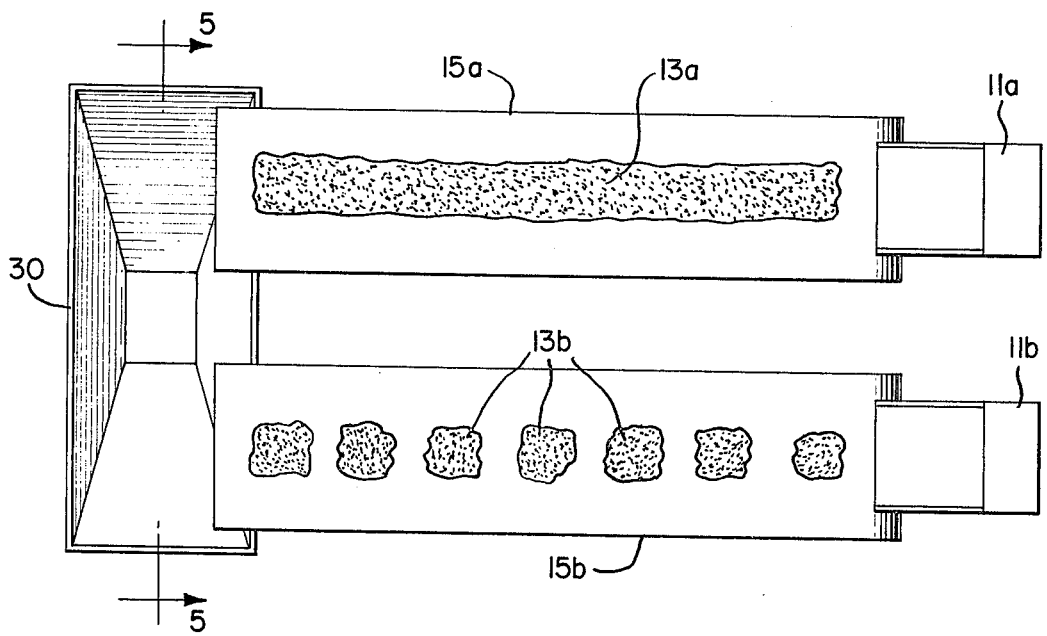
FIG. 4 is a top plan schematic illustration of an alternate embodiment of the material dispensing system of this invention utilizing two conveying units.
Figure 5:
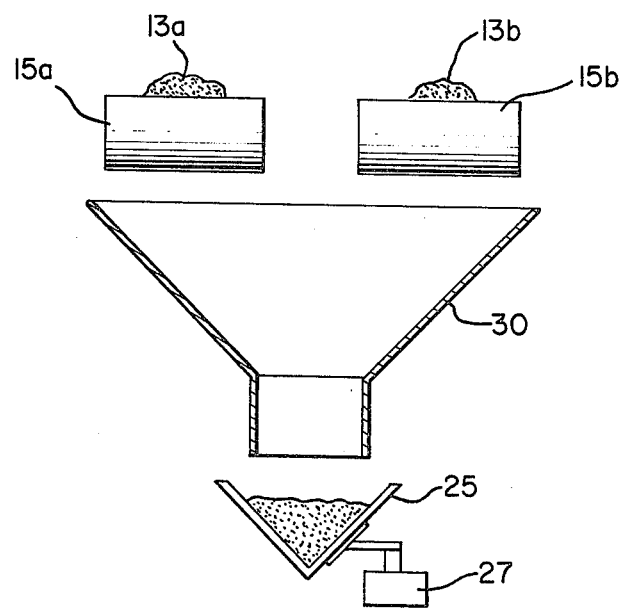
FIG. 5 is a vertical sectional view taken along line 5—5 of FIG. 4.

With reference to FIGS. 3, 4 and 5, there is illustrated a system and a series of graphical displays of the timing waveforms associated with an alternate embodiment of the instant invention. When relatively large quantities of material are to be deposited in a package, the feeder 11a continuously deposits a relatively large unit amount 13a of material onto a first conveyor belt 15a. The feed may continue through a period of time commencing at time $t_1$ as illustrated graphically in FIG. 3a. The feed of material may commence in the fashion of commencement of the feed of the unit amounts 13 from feeder 11. To this end, the feed commences as the advance pulse goes negative at time $t_1$. This bulk dispensing of the feed onto the conveyor belt is terminated after a predetermined time, such as at time $t_{x+3}$, when the bulk quantity of feed on the belt approaches a high percentage, for example, 90 percent of the weight of the material to be deposited in the hopper 25. After the bulk quantity of material has been dispensed onto the conveyor belt, the movement of the belt and the energization of the feeder 11a are stopped so that the transients in the system die out. Toward the end of this pause interval, say at time $t_{x+5}$, as illustrated in FIG. 3b, the weight of the conveyor belt with the material thereon as measured by scales 31 and 32 is sensed by strobing the scales. This weight value is digitized and stored in the control unit 23. Throughout the same time interval, a second belt 15b is intermittently advanced and unit amounts 13b of material dispensed from a second feeder unit 11b are received thereon. In the fashion of operation of the FIG. 1 embodiment, each time a unit amount 13b of material is dispensed onto the conveyor belt, the conveyor belt and feeder are deenergized so that the transients in the system die out and the weight of the material is detected. This operation is similar to the operation of the FIG. 1 embodiment as graphically illustrated by FIGS. 3c, d and e.

As aforementioned in connection with the FIG. 1 embodiment, the weight of each unit amount 13b of material deposited on the conveyor belt is determined and stored in the control unit 23. After a plurality of unit amounts 13b of material have been deposited on the conveyor belt, the control unit 23 sums the weight of the bulk quantity 13a on the conveyor belt 15a with sufficient number of the unit amounts 13b of material to equal the desired weight of the charge 33 in the hopper 25. When the weight limit is reached, the motor for driving belt 15a drives the belt until the bulk quantity of material is deposited through chute 30 into the hopper. At the same time, a second motor drives the second belt 15b having the unit amounts of material thereon a predetermined distance so that the exact number of unit amounts required to being the weight of the material in the hopper 25 up to the desired weight limit are deposited therein. The time sequence of this discharge interval is illustrated by FIG. 3f.

Figure 6:
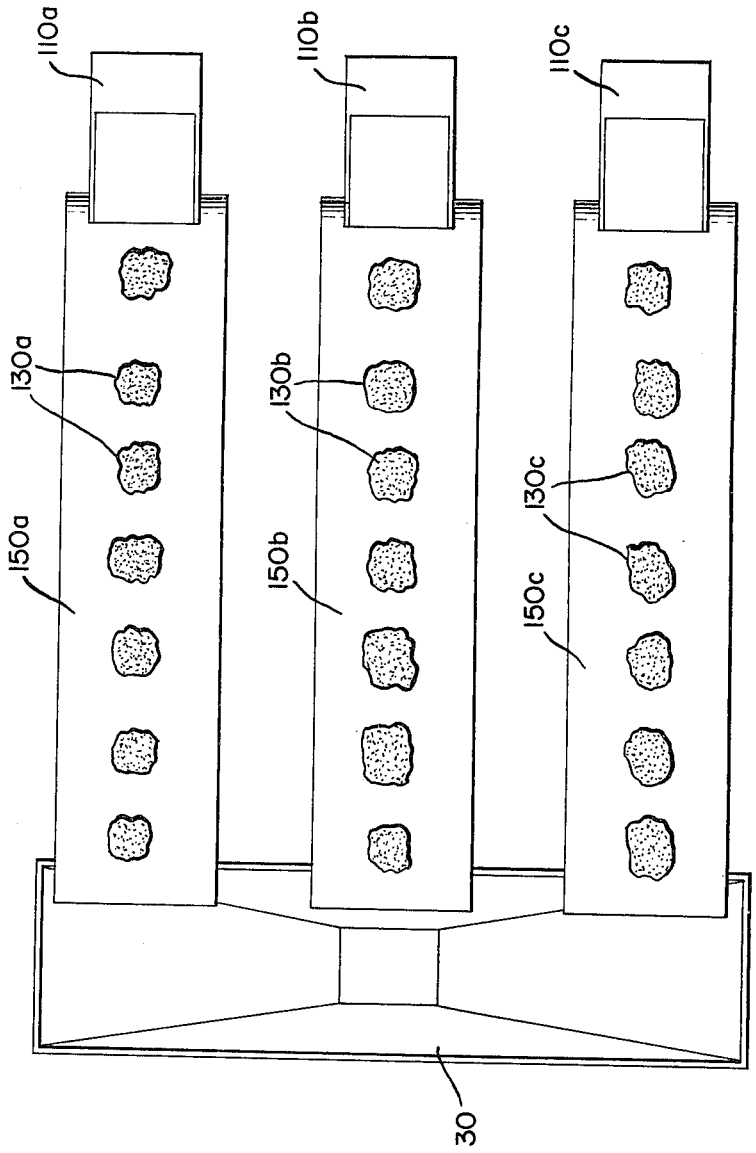
FIG. 6 is a top plan schematic illustration of a further alternate embodiment of the material dispensing system of this invention utilizing at least three conveying system.

A further alternative embodiment may be seen in FIG. 6. The system includes a plurality of feeders 110a, 110b and 110c, each capable of depositing unit amounts 130a, 130b and 130c of material onto a belt conveyor associated with the respective feeders. The belt conveyors are denominated by the numerals 150a, 150b and 150c.

The operation carried out by the control unit 23 for deposit of each unit amount duplicates substantially that of the FIG. 1 embodiment; whereas the summing operation of the unit amounts on the several conveyors and the drive to the same to deposit the required unit amounts to equal the desired weight limit duplicates that of the FIG. 4 embodiment. The unit amounts on each conveyor preferably will be of similar volume. However, the unit amounts in volume may differ from conveyor to conveyor. Thus, the control unit having capability of summing weights and clocking the feed locations on each conveyor belt to the memory storage means may make selection of a suitable number of unit amounts from the several conveyors for deposit to equal the desired weight of product. This is accomplished by controlled advance of the several conveyors.

As heretofore discussed, each conveyor has a run over an extended path from the respective feeders at one end to a chute 30 at the other end.

While preferred embodiments of the invention have been shown and described, it will be understood that the invention may be embodied otherwise than as herein illustrated and described and that certain changes in the form and the arrangement of the parts and in the specific manner of practicing the invention may be made without departing from the spirit of the invention as defined by the appended claims.

What is claimed is:

1. A package weight control system comprising a material charge receiving means, a conveyor means for dispensing material into said charge receiving means, means for sequentially dispensing material onto said conveyor means in unit amounts, means for determining the weight of each unit amount of material on said conveyor means and for storing the determined weight of each unit amount of material on said conveyor means, means for determining the weight of material required to provide a charge in said charge receiving means of a predetermined total weight, and means for advancing said conveyor means to dispense into said charge receiving means a number of unit amounts of material having a combined weight sufficient to bring the weight of the charge in said charge receiving means up to the predetermined total weight.

2. The package weight control system of claim 1 wherein said means for determining and storing the weight of each unit amount of material on said conveyor means comprises means for measuring the accumulated weight of material on said conveyor means after each unit amount of material has been deposited thereon, means for subtracting the previously measured accumulated weight from the present accumulated weight to obtain a difference value, and means for storing said difference value, said difference value being the weight of a unit amount of material.

3. A package weight control system comprising a material charge receiving means, at least two conveying means for dispensing material into said charge receiving means, means for dispensing first unit amounts of material onto the first of said conveying means, means for sequentially dispensing second unit amounts of material onto said second conveying means, means for determining the weight of each first unit amount of material on said first conveying means and for storing the determined weight of each first unit amount of material on said first conveying means, means for determining the weight of each second unit amount of material on said second conveying means and for storing the determined weight of each second unit amount of material on said second conveying means, means for determining the weight of material required to provide a charge in said charge receiving means having a predetermined total weight, and means for advancing each of said conveying means to dispense into said charge receiving means all the first unit amounts of material from said first conveying means and a number of second unit amounts of material from said second conveying means having a combined weight sufficient to bring the weight of the charge in said charge receiving means up to the predetermined total weight.

4. A package weight control system comprising a material charge receiving means, a conveyor means for dispensing material into said charge receiving means, means for sequentially dispensing unit amounts of material onto said conveyor means, means for calculating and storing the weight of each unit amount of material on said conveyor means, means for determining the quantity of material required to provide a charge in said charge receiving means of a predetermined weight, and means for advancing said conveyor means until the number of unit amounts of material required to bring the weight of the charge in said charge receiving means up to the predetermined charge weight are dispensed into said charge receiving means, said means for calculating and storing the weight of each unit amount of material on said conveyor means comprising means for measuring the accumulated weight of material on said conveyor means after each unit amount of material has been deposited thereon, means for subtracting the previously measured accumulated weight from the present accumulated weight to obtain a difference value, and means for storing said difference value, said difference value being the weight of a unit amount of material.

5. A package weight control system comprising a material charge receiving means; a plurality of conveying means for dispensing material into said charge receiving means; means for dispensing separate unit amounts of material onto said plurality of conveying means; means for determining the weight of each unit amount of material on said plurality of conveying means and for storing the determined weight of each unit amount of material; means for determining the weight of material required to provide a charge in said charge receiving means having a predetermined total weight; and means for advancing a plurality of said conveying means to dispense into said charge receiving means a combination of unit amounts of material having a combined weight sufficient to bring the weight of the charge in said charge receiving means up to the predetermined total weight.

* * * * *